US012719277B2

(12) United States Patent
Belur

(10) Patent No.: US 12,719,277 B2
(45) Date of Patent: Aug. 25, 2026

(54) LOAD DETECTION AND PRIORITIZATION FOR AN ENERGY MANAGEMENT SYSTEM

(71) Applicant: Enphase Energy, Inc., Petaluma, CA (US)

(72) Inventor: Raghuveer R. Belur, Los Altos Hills, CA (US)

(73) Assignee: Enphase Energy, Inc., Petaluma, CA (US)

( * ) Notice: Subject to any disclaimer, the term of this patent is extended or adjusted under 35 U.S.C. 154(b) by 491 days.

(21) Appl. No.: 17/334,050

(22) Filed: May 28, 2021

(65) Prior Publication Data

US 2021/0376606 A1 Dec. 2, 2021

Related U.S. Application Data

(60) Provisional application No. 63/033,201, filed on Jun. 1, 2020.

(51) Int. Cl.

| | |
|---|---|
| ***H02J 3/00*** | (2026.01) |
| ***G06Q 10/0631*** | (2023.01) |
| ***G06Q 50/06*** | (2012.01) |
| *H02J 103/35* | (2026.01) |
| *H02J 105/50* | (2026.01) |

(52) U.S. Cl.

CPC ........ *H02J 3/003* (2020.01); *G06Q 10/06312* (2013.01); *G06Q 50/06* (2013.01); *H02J 2103/35* (2026.01); *H02J 2105/51* (2026.01)

(58) Field of Classification Search

CPC .... H02J 3/003; H02J 2203/10; H02J 2310/58; H02J 2310/60; H02J 2310/70; H02J 3/14; G06Q 10/06312; G06Q 50/06; Y02B 70/3225; Y02P 80/10; Y04S 20/222

USPC ........................................................ 700/286

See application file for complete search history.

(56) References Cited

U.S. PATENT DOCUMENTS

| | | | |
|---|---|---|---|
| 5,243,291 | A | 9/1993 | Umemura |
| 6,107,926 | A | 8/2000 | Kifuku et al. |
| 8,415,830 | B2 | 4/2013 | Lim |
| 9,252,766 | B2 | 2/2016 | Kuang et al. |
| 9,350,193 | B2 | 5/2016 | Choi et al. |
| 9,906,029 | B2 | 2/2018 | Grohman |
| 10,147,148 | B2 | 12/2018 | Wu et al. |

(Continued)

FOREIGN PATENT DOCUMENTS

| | | |
|---|---|---|
| CN | 1 173 456 C | 10/2004 |
| CN | 105 675 974 A | 6/2016 |

(Continued)

OTHER PUBLICATIONS

International Search Report and Written Opinion for application No. PCT/US2021/035157 dated Sep. 17, 2021.

*Primary Examiner* — Mohammad Ali
*Assistant Examiner* — Saad M Kabir
(74) *Attorney, Agent, or Firm* — Moser Taboada

(57) ABSTRACT

A method and apparatus for detecting and prioritizing loads comprising a load analyzer configured to receive at least one load monitoring signal from at least one channel, where each channel is configured to be coupled to at least one load, and analyze at least one load signature derived from the at least one load monitoring signal to detect a load type that is connected to the at least one channel and assign an energy consumption priority to the at least one load.

20 Claims, 3 Drawing Sheets

(56) References Cited

U.S. PATENT DOCUMENTS

| | | | |
|---|---|---|---|
| 2001/0030468 | A1 | 10/2001 | Anderson et al. |
| 2006/0018069 | A1 | 1/2006 | Gull |
| 2006/0072262 | A1 | 4/2006 | Paik |
| 2007/0030613 | A1 | 2/2007 | Sousa et al. |
| 2010/0179708 | A1 | 7/2010 | Watson et al. |
| 2011/0138198 | A1 | 6/2011 | Boss |
| 2012/0153725 | A1 | 6/2012 | Grohman |
| 2012/0253881 | A1 * | 10/2012 | Schneider .............. G06Q 10/06 700/286 |
| 2014/0142724 | A1 | 5/2014 | Park et al. |
| 2014/0210267 | A1 | 7/2014 | Ishida et al. |
| 2015/0214768 | A1 | 7/2015 | Matsuyama et al. |
| 2015/0346243 | A1 | 12/2015 | Ota |
| 2017/0288542 | A1 | 10/2017 | Pan et al. |

FOREIGN PATENT DOCUMENTS

| | | | |
|---|---|---|---|
| JP | 2013-528876 | A | 7/2013 |
| KR | 101392460 | B1 | 5/2014 |
| WO | WO 2004/023624 | A1 | 3/2004 |
| WO | WO-2009101711 | A1 | 8/2009 |
| WO | WO 2011/153401 | A2 | 12/2011 |
| WO | WO-2012137670 | A1 | 10/2012 |
| WO | WO 2013/038458 | A1 | 3/2013 |
| WO | WO 2013/048020 | A1 | 4/2013 |

* cited by examiner

LOAD DETECTION AND PRIORITIZATION FOR AN ENERGY MANAGEMENT SYSTEM

RELATED APPLICATION

This application claims benefit to U.S. Provisional Patent Application Ser. No. 63/033,201, filed 1 Jun. 2020 and entitled "Load Detection and Prioritization For An Energy Management System," which is hereby incorporated herein in its entirety by reference.

BACKGROUND

Field

Embodiments of the present invention generally relate to energy management systems and, in particular, load detection and prioritization within an energy management system.

Description of the Related Art

Energy management systems manage energy distribution and consumption within a facility, e.g., residential or commercial building, campus or neighborhood. Generally, an energy management system receives energy from a plurality of energy sources (e.g., power grid, alternative energy generator(s), and/or energy storage) and manages the consumption of the energy through control of consumption of the energy by various loads. To most efficiently use the energy, the energy management system controls generation, storage and consumption of the energy. More specifically, the system optimizes energy production, while controlling the amount of produced energy that is either stored or consumed. Some systems also determine an amount of surplus energy to supply to the power grid.

One important aspect of an energy management system is to control energy consumption in view of the amount of energy available from the energy sources, e.g., distributed generator or storage. Typically, consumption control involves prioritizing loads and controlling the amount of energy consumed the loads in accordance with a prioritization schedule.

In some current energy management systems, energy is supplied to the entire facility through a power cable to a service panel and, through monitoring the energy flow through the power cable, the energy management system disaggregates the types of loads connected to the service panel. This technique is known as software load disaggregation. A very complex analysis algorithm is necessary to identify energy utilization signatures of the various loads connected to the service panel. Using the load signatures, the energy management system detects the load types, creates a prioritization map for each load type and, in view of the prioritization map, controls consumption by activating and deactivating critical loads via a WiFi connection to each load. Such a system is very complex and requires substantial computing resources to disaggregate loads connected to a single energy source to the service panel. Because the energy management system is attempting to disaggregate all the loads via signature identification on a single power cable, these systems are notoriously inaccurate and invariably require human intervention to correct the prioritization map.

In another energy management system, hardware disaggregation is used, where individual loads are connected to individual electric circuits. During installation, an installer connects each critical load to the energy management system through a circuit. The system is programmed to establish a priority for each circuit. For example, an air conditioner may receive a higher priority during the day vis a' vis a hot water heater. As such, assuming energy is not available to run both appliances simultaneously, the management system can reduce the power consumption of the water heater during the afternoon and prioritize use of the air conditioner.

Each circuit is used to monitor the energy consumed by its associated load, e.g., refrigeration unit, air conditioner, water heater, dishwasher, factory machinery, and the like. In view of the consumption and the prioritization schedule, the system, using a relay or switch in each circuit, disconnects certain loads at certain times to ensure the consumption of energy is optimized. During installation, the installer must manually map each critical load to a circuit and set a prioritization for the circuit. This process is time consuming and fraught with error.

Therefore, there is a need in the art for an improved load detection and prioritization technique for an energy management system.

BRIEF DESCRIPTION OF THE DRAWINGS

So that the manner in which the above recited features of the present invention can be understood in detail, a particular description of the invention, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention comprise apparatus and methods for performing load detection and prioritization within an energy management system. An energy management system manages energy utilization within a commercial or residential facility. Typically, energy is available from a conventional power grid, distributed generators (e.g., solar power, wind power, hydroelectric power, bio-mass generated power and the like) and energy storage (e.g., battery storage, thermal storage, kinetic storage and the like). The energy management system manages consumption or storage of the available energy. Consumption management occurs through management of which loads receive energy at any given time. Scheduling the consumption is prioritized to enable high priority loads to receive energy on a priority basis. Embodiments of the present invention automatically detect the loads and establish a priority schedule to avoid the need for a human installer to accomplish the task.

Figure 1:
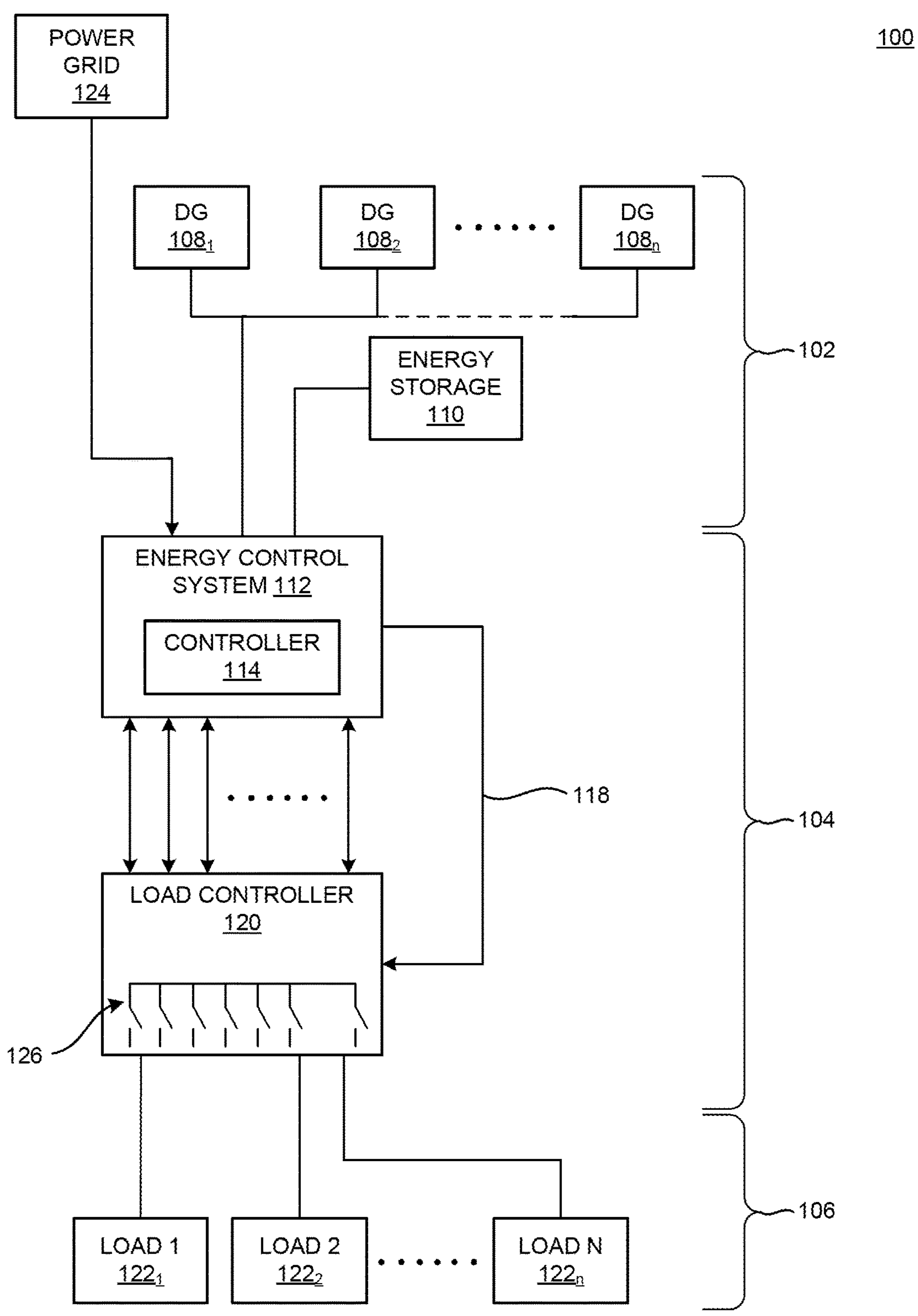
FIG. 1 depicts an energy management system as managing energy produced by distributed generators and energy storage in accordance with at least one embodiment of the invention.

FIG. 1 depicts an energy generation and consumption scenario 100 including an energy management system 104 in accordance with at least one embodiment of the invention. In one embodiment, the energy management system 104 is coupled between energy sources 102 and loads 106. The energy sources 102 comprise at least one of a conventional power grid 124, distributed generators $\mathbf{108}_1$, $\mathbf{108}_2$, . . . $\mathbf{108}_n$ (collectively, distributed generators 108) (e.g., solar power, wind power, hydroelectric power, bio-mass generated power and the like) and energy storage 110 (e.g., battery storage, thermal storage, kinetic storage and the like). The loads 106 comprise various appliances or machinery that consume energy. The individual loads $\mathbf{122}_1$, $\mathbf{122}_2$, . . . $\mathbf{122}_n$, (collectively, loads 106) in a residential scenario, may include, but are not limited to, one or more of a refrigerator, a washer, a dryer, a hot water heater, pool filtration system, air conditioning/heating unit, well pump and the like. In a commercial scenario, the individual loads may include, but are not limited to, a refrigeration unit, an air conditioner/heating unit, manufacturing equipment, robotic equipment, and the like. The foregoing load examples are merely exemplary of the types of loads that may be controlled by the energy management system 104. More broadly, the loads may be any device, component or system that consumes electrical energy.

In one embodiment, the energy management system 104 comprises an energy control system 112 and a load controller 120. The energy control system 112 comprises a controller 114 for executing software programs configured to detect and prioritize loads in accordance with embodiments of the invention. In the depicted embodiment, the energy control system 112 is coupled to the load controller 120 via at least one control channel 116. Each channel represents a critical load $\mathbf{122}_1$, $\mathbf{122}_2$, . . . or $\mathbf{122}_n$. A channel couples a monitoring signal from the load controller 120 and carries a control signal to the load controller 120 to facilitate control of the load associated with each particular channel. A channel may be coupled via an electric circuit to a plurality of devices, components, or systems that form a load for a given channel.

Electric power from one or more of the energy sources 102 is coupled along path 118 to the load controller 120. The load controller 120 comprises an array of switches 126 that control energy flow to the loads 106. The control signals on the control channels 116 control which of the switches 126 are closed or open.

In one embodiment, the load controller 120 monitors the current and voltage being supplied to each load 106. A monitoring signal representing the current and voltage to each load 106 is coupled to the energy control system 112 via each at least one channel 116. As described in detail below, the controller 114 analyzes the at least one monitoring signal to determine what type of load is connected to the at least one channel and prioritize the at least one detected load. In another exemplary embodiment, there are a plurality of channels and the controller 114 monitors and analyzes a plurality of monitoring signals to prioritize a plurality of loads coupled to the plurality of channels.

Figure 2:
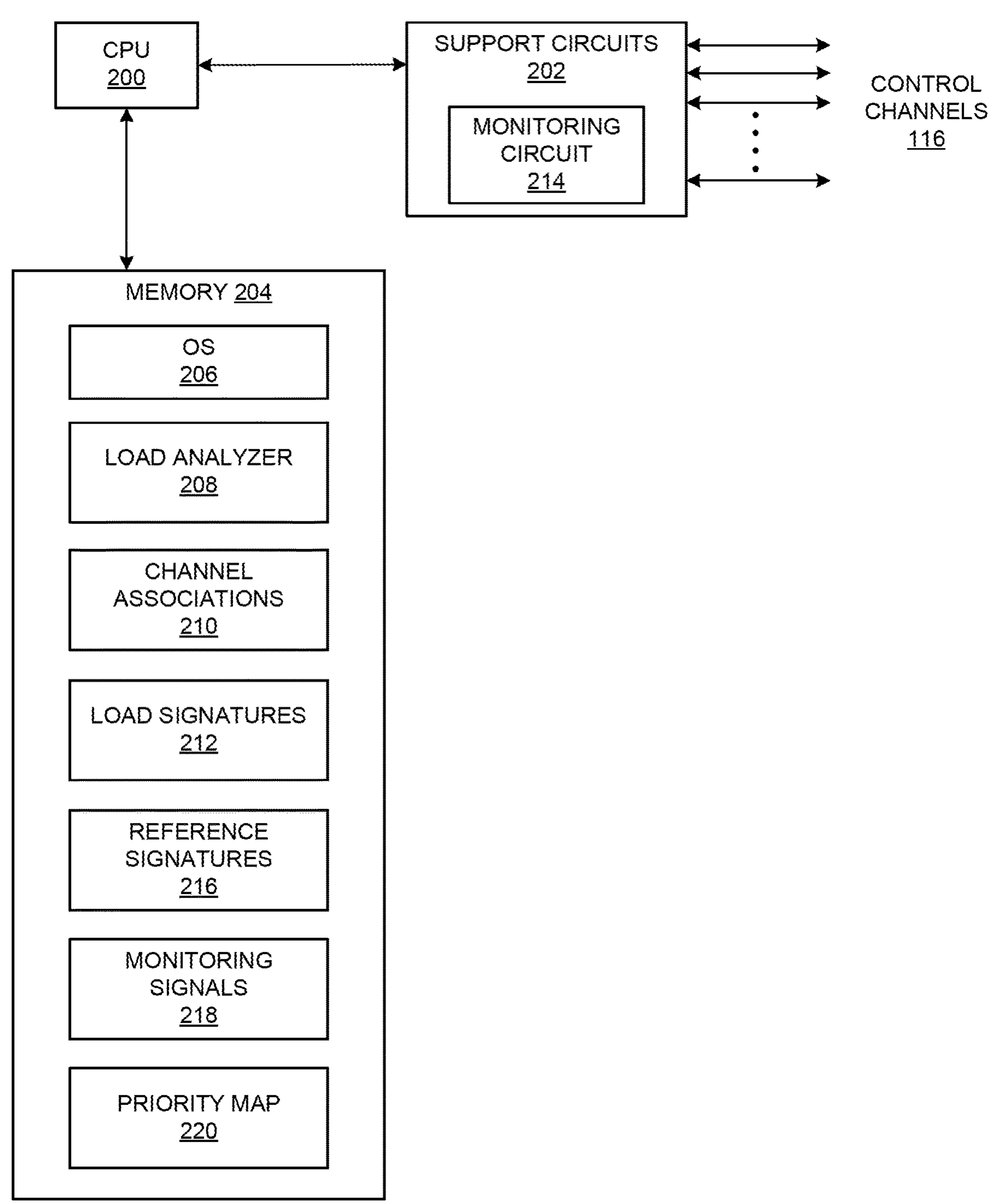
FIG. 2 depicts a block diagram of a controller used as a component of the energy management system of FIG. 1.

FIG. 2 depicts a block diagram of an embodiment of the controller 114 of FIG. 1. The controller 114 comprises a central processing unit (CPU) 200, support circuits 202, and memory 204. The CPU 200 comprises one or more processors including, but not limited to, one or more of an application specific integrated circuit, microprocessor, microcontroller, and the like. The support circuits 202 comprises circuits and devices that support the functionality of the CPU and include, but not limited to, one or more of clock circuits, analog to digital converters, cache, power supplies, and the like. In one embodiment, the support circuits 202 comprise a monitoring circuit 214 configured to digitize the monitoring signals associated with each channel 116. In other embodiments, the monitoring circuit 214 may be located in the load controller 120 of FIG. 1 such that digital representations of the monitoring signals are coupled to the controller 114.

The memory 204 is one or more non-transitory storage media comprising read only memory, random access memory, or a combination thereof for storing software and data. In one embodiment, the software comprises an operating system 206 and application software (load analyzer 208). The operating system (OS 206) facilitates functionality of the CPU 200 and comprises, for example, WINDOWS, LINUX, macOS, and the like. In some embodiments, the CPU 200 may comprise a microcontroller that does not rely on an operating system. In such a case, the memory 204 may not store an operating system 206.

In one embodiment, the application software comprises a load analyzer 208 which utilizes or generates data comprising channel associations 210, at least one load signature 212, at least one reference signature 216, at least one monitoring signal 218 and a priority map 220. The load analyzer 208 analyzes the digitized at least one monitoring signal 218 to produce at least one load signature 212 for at least one channel 116. The load signature 212 contains unique voltage and current characteristics of a load as well as timing information regarding when the load is activated (i.e., activation data). The load analyzer 208 compares the at least one load signature 212 to at least one reference signature 216. In an exemplary embodiment, the load signature 212 is compared to a set of reference signatures 216. The reference signatures 216 comprise predefined signatures of various appliance types, e.g., refrigerator, dishwasher, hot water heater and the like. The priority map 220 comprises, for each load type, an indicium of energy consumption priority with respect to other loads. For example, the prioritization map may specify, that, during the afternoon, an air conditioner has priority over a hot water heater. Using the priority map 220, load signatures 212, and reference signatures 216, the load analyzer 208 creates channel associations 210 that lists the identified loads, the associated channel for the load, and the priority for the load. In one embodiment, the priority map contains pre-defined priorities; however, a user may customize the priorities to meet their personal or corporate requirements.

In one embodiment, the priority map 220 and the channel associations 210 are automatically discovered by the load analyzer 208. In another embodiment, an installer may initially establish the channel associations and set the priorities for the loads. Through repeated analysis of energy consumption over time, the load analyzer 208 may update the priorities (e.g., determine that certain loads are used less than others, thus requiring lower priority). In another embodiment, the repeated historical analysis is used to correct installer errors, i.e., if the installer initially, and incorrectly, identified a given channel as associated with a hot water heater, after analysis, the load analyzer recognizes that the channel is actually associated with a refrigerator and updates the channel association and prioritization map.

Figure 3:
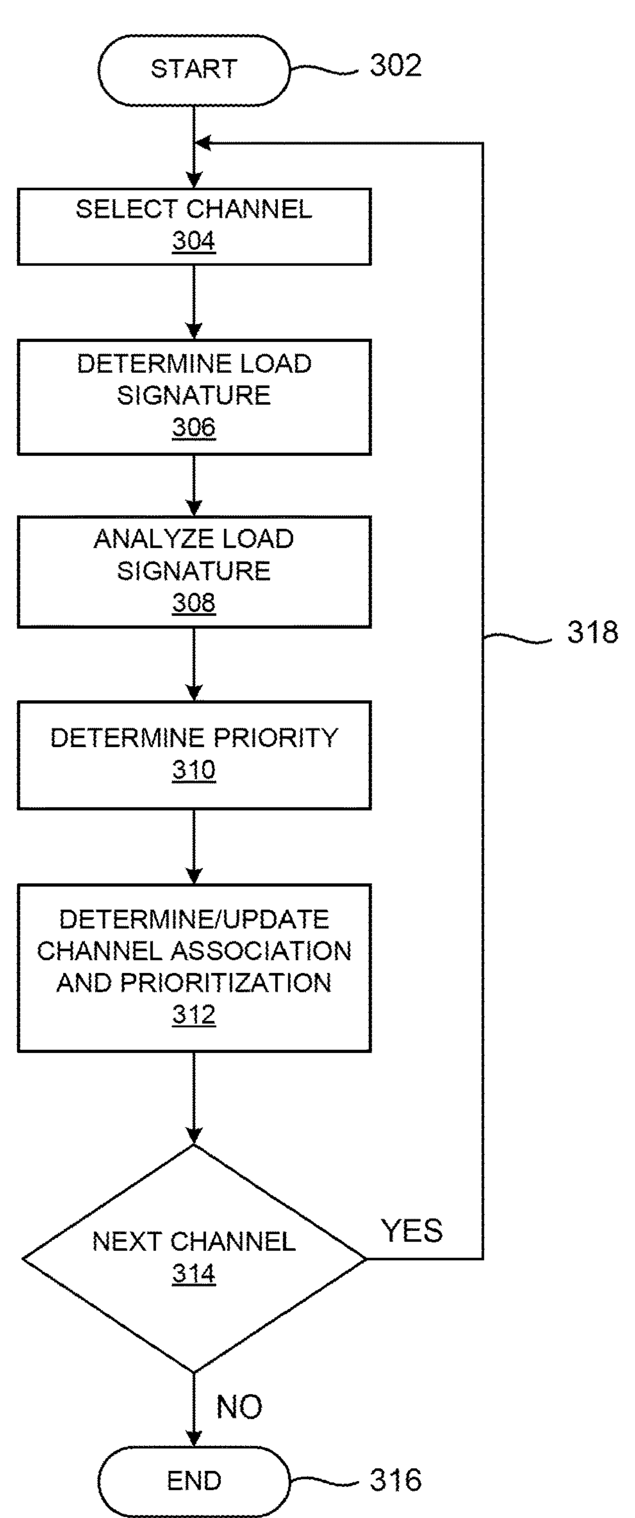
FIG. 3 depicts a flow diagram of operation of a load analyzer that performs load detection and prioritization in accordance with at least one embodiment of the invention.

FIG. 3 is a flow diagram of a method 300 of operation of the load analyzer 208 of FIG. 2 in accordance with at least one embodiment of the present invention. Any block, step, module, or otherwise described below may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e., within tolerances of the systems executing the block, step, or module. Of course, such blocks are presented for illustration purposes only and any one or more block, step, or module may be combined with any other, removed, split, or moved between the various systems and subsystems illustrated.

Method 300 begins at step 302 and proceeds to step 304 where the method 300 selects a channel to be analyzed. At step 306, the method 300 accesses the monitoring signal for the selected channel and uses that data to determine a load signature for the load connected to the selected channel. The load signature includes a voltage and current signature (values over time) for the load as well as historical activation data (i.e., a refrigerator turns on and off repeatedly throughout a day while a dishwasher may be activated once per day or less).

At step 308, the method 300 analyzes the load signature by comparing it to a database of reference signatures. As such, from the load signature, the method 300 detects the type of load. At step 310, the method uses a database of priorities to determine the priority of the detected load with respect to other detected loads. At step 312, the method determines or updates the channel associations and prioritizations based on the detected load and its priority. Note that an update to one priority may impact other priorities such that priorities for other loads are also updated.

At step 314, the method queries whether a next channel is to be analyzed. If the query is positively answered, the method 300 proceeds along path 318 to step 304 to begin analyzing another channel. If the query is negatively answered, the method 300 ends at step 316.

The forgoing embodiments of the invention may be used to autonomously detect loads connected to each channel and assign a priority to the load. In this manner, energy is consumed based on the prioritization such that energy consumption is optimized. By optimizing energy consumption, a given facility is able to either use no grid supplied energy or use a minimal amount.

Prioritization may also be altered based on the energy supply being used. For example, when energy is being supplied from the grid, the loads may have no prioritization or limited prioritization (i.e., for efficiency purposes). However, when energy is supplied from, for example, a solar array, the load priority map may prioritize certain critical loads over other loads. Similarly, when energy is supplied from energy storage where the energy supply may be limited, the load priority map may have an altogether different prioritization to optimize the duration that the storage system can be used.

Embodiments of the invention create a significant improvement in load detection and prioritization. The inventive system avoids and/or corrects human error in load assignments and, through its use of a channelized load control strategy, improves the accuracy of load detection using load signatures when compared to traditional software disaggregation techniques.

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the invention presented herein. The invention is not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e. within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g., one or more of A, B, and/or C), unless stated otherwise, it is understood to include one or more of each element, including any one or more combinations of any number of the enumerated elements (e.g., A, AB, AC, ABC, ABB, etc.). When "and/or" is used, it should be understood that the elements may be joined in the alternative or conjunctive.

While the foregoing is directed to embodiments of the present invention, other and further embodiments of the invention may be devised without departing from the basic scope thereof, and the scope thereof is determined by the claims that follow.

The invention claimed is:

1. Apparatus for detecting and prioritizing loads comprising:

a load analyzer of an energy control system configured to connect to a power grid, the load analyzer configured to receive at least one load monitoring signal from at least one channel, where the at least one channel is coupled to a load, and analyze at least one load signature derived from the load monitoring signal to automatically detect a load type that is connected to the at least one channel and assign an energy consumption priority through repeated analysis of energy consumption over time for the at least one load such that energy consumption is optimized to either use no grid supplied energy or use less than a maximum amount of grid supplied energy and through the repeated analysis identify errors with channel and load associations, correct the errors with the channel and load associations, and update the channel and load associations and a priority map that contains the energy consumption priority.

2. The apparatus of claim 1 wherein the at least one load signature comprises voltage and current values on the at least one channel when the at least one load is consuming energy.

3. The apparatus of claim 2 wherein the at least one load signature further comprises historical activation data for the at least one load.

4. The apparatus of claim 1 wherein the load analyzer compares the at least one load signature to at least one reference signature to detect the load type.

5. The apparatus of claim 1 wherein the load analyzer generates the priority map containing the energy consumption priority.

6. The apparatus of claim 5 wherein the priority map comprises a plurality of energy consumption priorities and each energy consumption priority in the plurality of energy consumption priorities establishes a utilization priority for a particular load.

7. The apparatus of claim 6 wherein the plurality of energy consumption priorities are predefined and are updated with the assigned energy consumption priority.

8. A method for detecting and prioritizing at least one load comprising:

receiving at least one load monitoring signal from at least one channel, where the at least one channel is configured to be coupled to at least one load, and analyzing at least one load signature derived from the at least one load monitoring signal to automatically detect a load type that is connected to the at least one channel and assign an energy consumption priority through repeated analysis of energy consumption over time for the at least one load such that energy consumption is optimized to either use no grid supplied energy or use less than a maximum amount of grid supplied energy and through the repeated analysis identify errors with channel and load associations, correct the errors with the channel and load associations, and update the channel and load associations and a priority map that contains the energy consumption priority.

9. The method of claim 8 wherein the at least one load signature comprises voltage and current values on the at least one channel when the at least one load is consuming energy.

10. The method of claim 9 wherein the at least one load signature further comprises historical activation data for the at least one load.

11. The method of claim 8 further comprising comparing the at least one load signature to at least one reference signature to detect the load type.

12. The method of claim 8 further comprising generating the priority map containing the energy consumption priority.

13. The method of claim 12 wherein the priority map comprises a plurality of energy consumption priorities and each energy consumption priority in the plurality of energy consumption priorities establishes a utilization priority for a particular load.

14. The method of claim 13 wherein the plurality of energy consumption priorities are predefined and are updated with the assigned energy consumption priority.

15. One or more non-transitory computer readable media for storing instructions that, when executed by one or more processors, cause the processor to perform operations comprising:

receiving at least one load monitoring signal from at least one channel, where the at least one channel is configured to be coupled to at least one load, and analyzing at least one load signature derived from the at least one load monitoring signal automatically detect a load type that is connected to the at least one channel and assign an energy consumption priority through repeated analysis of energy consumption over time for the at least one load such that energy consumption is optimized to either use no grid supplied energy or use less than a maximum amount of grid supplied energy and through the repeated analysis identify errors with channel and load associations, correct the errors with the channel and load associations, and update the channel and load associations and a priority map that contains the energy consumption priority.

16. The operations of claim 15 wherein the at least one load signature comprises voltage and current values on the at least one channel when the at least one load is consuming energy.

17. The operations of claim 16 wherein the at least one load signature further comprises historical activation data for the at least one load.

18. The operations of claim 15 further comprising comparing the at least one load signature to at least one reference signature to detect the load type.

19. The operations of claim 15 further comprising generating the priority map containing the energy consumption priority.

20. The operations of claim 19 wherein the priority map comprises a plurality of energy consumption priorities and each energy consumption priority in the plurality of energy consumption priorities establishes a utilization priority for a particular load.

* * * * *